Patented May 18, 1943

2,319,695

UNITED STATES PATENT OFFICE 2,319,695

SODIUM FERRICYANIDE WITH 2H₂O

Urner Liddel, Greenwich, Conn., assignor to American Cyanamid Co., New York, N. Y., a corporation of Maine No Drawing. Application October 2, 1940, Serial No. 359,341

1 Claim. (Cl. 23—77)

The present invention relates to dry solid sodium ferricyanide having two molecules of water of crystallization.

It is the principal object of the invention to recover such solid sodium ferricyanide from aqueous solutions thereof of maximum purity with minimum quantities of contaminating sodium ferrocyanide and sodium chloride.

In the commercial production of sodium ferricyanide, the corresponding ferrocyanide is oxidized as by means of chlorine. Due to the crude material from which the original sodium ferrocyanide is made and to compounds added for other purposes, many impurities carry straight through to the final solution of sodium ferricyanide. Among such impurities is sodium chloride, which may be present in amounts greater than 4% as well as complex ferri ferri color bodies, insolubles and unconverted sodium ferrocyanide. If this crude sodium ferricyanide liquor, therefore, is used as the starting material, it is desirable to preliminarily treat the same as by means of caustic soda solutions, in excess so as to decompose the ferri ferri complexes and convert them to ferric hydroxide. A filtration operation may then be resorted to, to remove this iron hydroxide and other insolubles. The presence of normal quantities of sodium chloride and unconverted sodium ferrocyanide is not unduly detrimental to the process as they will be eliminated during the crystallization procedure.

The invention contemplates generally the cooling of a reasonably pure sodium ferricyanide solution containing preferably more than 25% of the latter to a temperature lower than −10° C. at which temperature the solution becomes supersaturated with sodium ferricyanide, with consequent precipitation of the latter as the polyhydrate with plus or minus 16 H₂O (i. e., not less than 15 nor more than 17). These crude crystals and still containing some salt, are warmed to substantially 15° C., dissolved in a small amount of water and then cooled to substantially 5° C. Recrystallized sodium ferricyanide with substantially 16 molecules of water of crystallization precipitates as non-deliquescent ruby red crystals. They are stable below 12° C. The cooling route for recovery is of distinct value in contradistinction to that of water evaporation, as there is a definite tendency for ferricyanide to decompose at a comparatively low temperature. If these purified crystals are then warmed to from 12° to 40° C., and a slow evaporation of the water permitted, crystals of sodium ferricyanide with two molecules of water of crystallization precipitate.

As a specific example, a crude sodium ferricyanide solution containing greater than 25% of the salt and 4% sodium chloride, with a pH of about 8.5 was treated with a 25% caustic soda solution with agitation until a pH of 9.5 resulted. .75% excess caustic soda based on the weight of the batch being treated was added beyond this point to insure the decomposition of ferri ferri complexes. The color of the initial crude ferricyanide solution was green due to these complexes, whereas after the caustic soda addition and a filtering step to remove ferric hydroxide, sodium ferrocyanide and other insolubles, the color was red. This caustic treatment preferably takes place while the batch is being heated to not exceeding 65° C., following which it is cooled to approximately 15° C., filtered and the filter cake discarded.

To 500 cc. of the above filtrate, sufficient mineral acid such as hydrochloric was added to adjust the pH to 8.5. This assists in preventing reversion of ferricyanide to the ferro form. The batch was then cooled to less than −10° C., which produced supersaturation and the batch filtered on a fritted glass filter. The volume of the filtrate was 240 cc. and the ferricyanide content was 18.5 grams per 100 cc., giving a theoretical yield of 78.4% of the available ferricyanide in the frozen residue. The filtrate still containing considerable ferricyanide values was recycled with additional caustic treated ferricyanide solution.

The residue on the filter was a crude sodium ferricyanide polyhydrate having substantially 16 molecules of water of crystallization.

Such polyhydrate crystals were then warmed to between 12° and 40° C., and evaporation induced by flowing a stream of air thereover at the above temperature. Crystals of sodium ferricyanide with two molecules of water of crystallization formed, and were separated from the mother liquor by filtration. The filtrate was recycled. Such crystals are of exceptional purity being particularly free from salt and the ferro complex. Upon permitting the crystals to warm to 15° C., adding just sufficient water to dissolve the same and cooling to 5° C., recrystallized ferricyanide polyhydrate crystals were obtained of good purity.

Another method of treatment which may be resorted to is to permit the crude polyhydrate crystals to warm up to room temperature so as to decompose the polyhydrate crystals therein to the dihydrate followed by filtration. These filtered dihydrate crystals were found to contain .025 ferrocyanide and .42 sodium chloride and were, consequently, of reagent purity.

In the purification method above, the filtrate from the recrystallized material may be recycled to recover the values therein.

It has been found that $Na_3Fe(CN)_6.2H_2O$ crystals are completely non-deliquescent. Their refractive indices are as follows:

| $n_1$ | $n_2$ | $n_3$ | sign | 2V |
|---|---|---|---|---|
| 1.566 | 1.549 | 1.531 | + | very large > 75° |

Its solubility in grams per 100 cc. is—

| 50° C. | 20° C. | 0° C. |
|---|---|---|
| 47.8 | 45.5 | 41.5 |

They are very light-sensitive and should be stored in a dark place. When this precaution is ignored, their color changes from red to blue, indicating the formation of a ferri ferri complex.

They may be used in light-sensitive work, such as in the photographic art.

While the above description indicates the use of a crude sodium ferricyanide solution with a purification step, yet if a pure ferricyanide solution is available, it may obviously be used without the necessity of purification.

In the above initial cooling step to produce crude sodium ferricyanide polyhydrate crystals, a temperature should be used sufficiently low to produce supersaturation. This temperature will, of course, vary according to the concentration of sodium ferricyanide initially used.

While the invention has been shown and described with particular reference to specific embodiments, it is to be understood that it is not to be restricted thereto but is to be construed broadly and limited solely by the scope of the appended claim.

I claim:

The method of producing dry, non-deliquescent $Na_3Fe(CN)_6.2H_2O$ which comprises cooling a reasonably pure sodium ferricyanide solution to a temperature lower than about $-10°$ C. whereby sodium ferricyanide crystals containing substantially sixteen molecules of water of crystallization are obtained, filtering off said polyhydrate crystals and warming them to from about 12° C. to about 40° C. in order to evaporate the excess water of crystallization.

URNER LIDDEL.